United States Patent [19]
Burke

[11] Patent Number: 6,032,162
[45] Date of Patent: Feb. 29, 2000

[54] SYSTEM FOR PROCESSING AND STORING INTERNET BOOKMARK ADDRESS LINKS

[76] Inventor: Alexander James Burke, 3 Glenside Ter., Upper Montclair, N.J. 07043

[21] Appl. No.: 09/004,409

[22] Filed: Jan. 8, 1998

[51] Int. Cl.[7] .................................................. G06F 13/00
[52] U.S. Cl. ........................................... 707/501; 709/206
[58] Field of Search .................................... 707/501, 513; 709/203, 218, 206; 345/335, 348–351, 356, 357

[56] References Cited

U.S. PATENT DOCUMENTS

| | | | |
|---|---|---|---|
| 5,598,536 | 1/1997 | Slaughter, III et al. | 395/200.16 |
| 5,617,565 | 4/1997 | Augenbraun et al. | 395/604 |
| 5,636,216 | 6/1997 | Fox et al. | 370/402 |
| 5,701,451 | 12/1997 | Rogers et al. | 395/600 |
| 5,710,883 | 1/1998 | Hong et al. | 395/200.17 |
| 5,796,393 | 8/1998 | Macnaughton et al. | 345/329 |
| 5,848,410 | 12/1998 | Walls et al. | 707/4 |
| 5,867,667 | 2/1999 | Butman et al. | 395/200.79 |
| 5,895,471 | 4/1999 | King et al. | 707/104 |

FOREIGN PATENT DOCUMENTS

| | | | |
|---|---|---|---|
| WO 96/31826 | 10/1996 | WIPO | G06F 13/00 |
| WO 96/39770 | 12/1996 | WIPO | H04L 29/06 |
| WO 97/44747 | 11/1997 | WIPO | G06F 17/30 |

OTHER PUBLICATIONS

Netangels Take Flight; Multimedia Daily by BRP Publications, Jul. 24, 1996.

Maarek et al; Automatically Organizing Bookmarks Per Contents; Computer Networks and ISDN Systems; vol. 28, No. 7–11, pp. 1321–1333, May 1996.

Susaki et al; Information Sharing System on the WWW With Interactive Communication; Computer Networks and ISDN Systems; vol. 30, No. 1–7, pp. 747–749, Apr. 1998.

Johnson, R.C.; Bookmark Organizer Ready; Electronic Engineering Times; n 859, p. 140, 1995.

Keller et al; A Bookmarking Service For Organizing and Sharing Urls; Computer Networks and ISDN Systems; vol. 29, No. 8–13, pp. 1103–1114, Sep. 1997.

Brown et al; Using Netscape(TM) 2, Special Edition; Que Corporation; p. 181, 1995.

Dan Amdur, "New Sites Aim to Personalize Web Navigation", Information & Interactive Services Report, BRP Publications, vol. 17, Issue 31, Sep. 6, 1996.

*Internetworking with TCP/IP*, vol. 1, third edition, by Douglas E. Comer, 1995, chapter 24 and chapter 28.

*Smartmarks Quick Start Guide*, 1997, by Netscape Communications Inc. pp. 1–6.

ORAMA announces the launch of iBookmarks.com, published by ORAMA Inc. on the Internet (http://www.orama.com), Dec. 5, 1997.

*Primary Examiner*—Joseph H. Feild
*Assistant Examiner*—R Bourque

[57] ABSTRACT

A system supports uploading, downloading, collating and storage of bookmark addresses (Universal Resource Locator codes—URLs) using a remote Internet site. A method for accessing Internet data using a remotely stored Internet address or bookmark (URL address code) at a User site involves initiating Internet communication with a remote Internet site and receiving User identification information for obtaining access to a stored bookmark. At least one bookmark stored at the remote Internet site is selected and transfer of data is initiated from an Internet data source at the selected bookmark address. The remote Internet site receives User identification information and bookmarks via Internet communication, stores the bookmarks in a file identifiable with the User Identification information and downloads the stored bookmarks in response to a request via Internet communication.

28 Claims, 5 Drawing Sheets

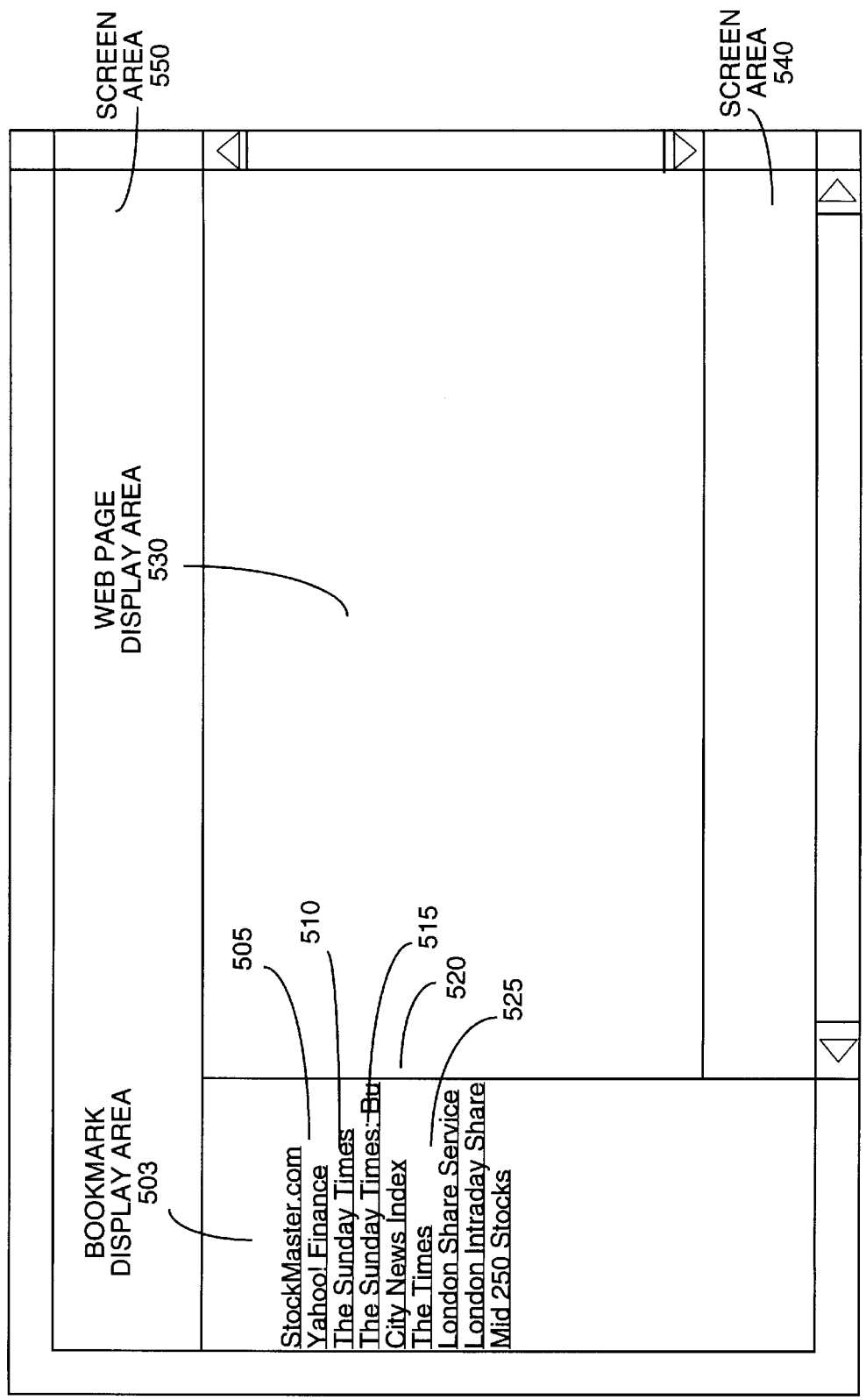

SYSTEM FOR PROCESSING AND STORING INTERNET BOOKMARK ADDRESS LINKS

FIELD OF THE INVENTION

This invention is related to the field of digital signal processing, and in particular to the processing, storage and activation of Internet address links.

BACKGROUND OF THE INVENTION

Internet web sites are accessed using Hyper text Mark-up Language (HTML) link addresses. An Internet HTML link address uniquely identifies a web site information source and supports communication between the source and a User at a different HTML address. An Internet User typically stores HTML link addresses of the web sites he accesses in a file to facilitate his future access to these web sites. The stored addresses are known as bookmarks and the file in which they are stored is known as a bookmark file. Bookmark files typically contain numerous addresses and individual addresses typically contain long cumbersome character strings. Consequently, an Internet User's ability to navigate the Internet is seriously impaired once he becomes deprived of the use of his own unique bookmark file.

A User may be deprived of the use of his bookmark file for a number of reasons. A bookmark file may become inaccessible because of a computer hardware failure or because the file is inaccessible behind a firewall as may occur if a User is remote from his normal location, for example. An Internet User may also be deprived of his normal bookmark file because of Internet overload or because of loss server storage and a variety of other reasons. These problems and derivative problems are addressed by a system according to the present invention.

SUMMARY OF THE INVENTION

A system for storing and activating HTML bookmark addresses i.e. web browser bookmarks at an Internet site involves uploading, collating and downloading bookmark addresses. A method for accessing Internet data using a remotely stored Internet address or bookmark (URL address code) at a User site involves initiating Internet communication with a remote Internet site and receiving User identification information for obtaining access to a stored bookmark. At least one bookmark stored at the remote Internet site is selected and transfer of data is initiated from an Internet data source at the selected bookmark address.

In a feature of the invention, the remote Internet site. receives User identification information and bookmarks via Internet communication, stores the bookmarks in a file identifiable with the User Identification information and downloads the stored bookmarks in response to a request via Internet communication.

BRIEF DESCRIPTION OF THE DRAWINGS

In the drawing:

FIG. 5 shows an exemplary User display interface for accessing data at Internet bookmark addresses stored in a remote Internet system, according to the invention.

DETAILED DESCRIPTION OF THE DRAWINGS

The inventor has recognized that the problem posed by Internet bookmark inaccessibility may be eliminated by providing a system supporting the storage of bookmarks at a dedicated Internet bookmark site. Bookmarks and bookmark files are uploaded to the bookmark site for storage and are downloaded to a User site upon User command. The Internet site receives bookmarks and bookmark files, identifies and collates the bookmarks and downloads the collated bookmarks to the User's site for activation. The inventor has further recognized that such a bookmark storage and activation service may be combined with other services such as an Email service of the type provided by Hotmail™, for example.

Figure 1:
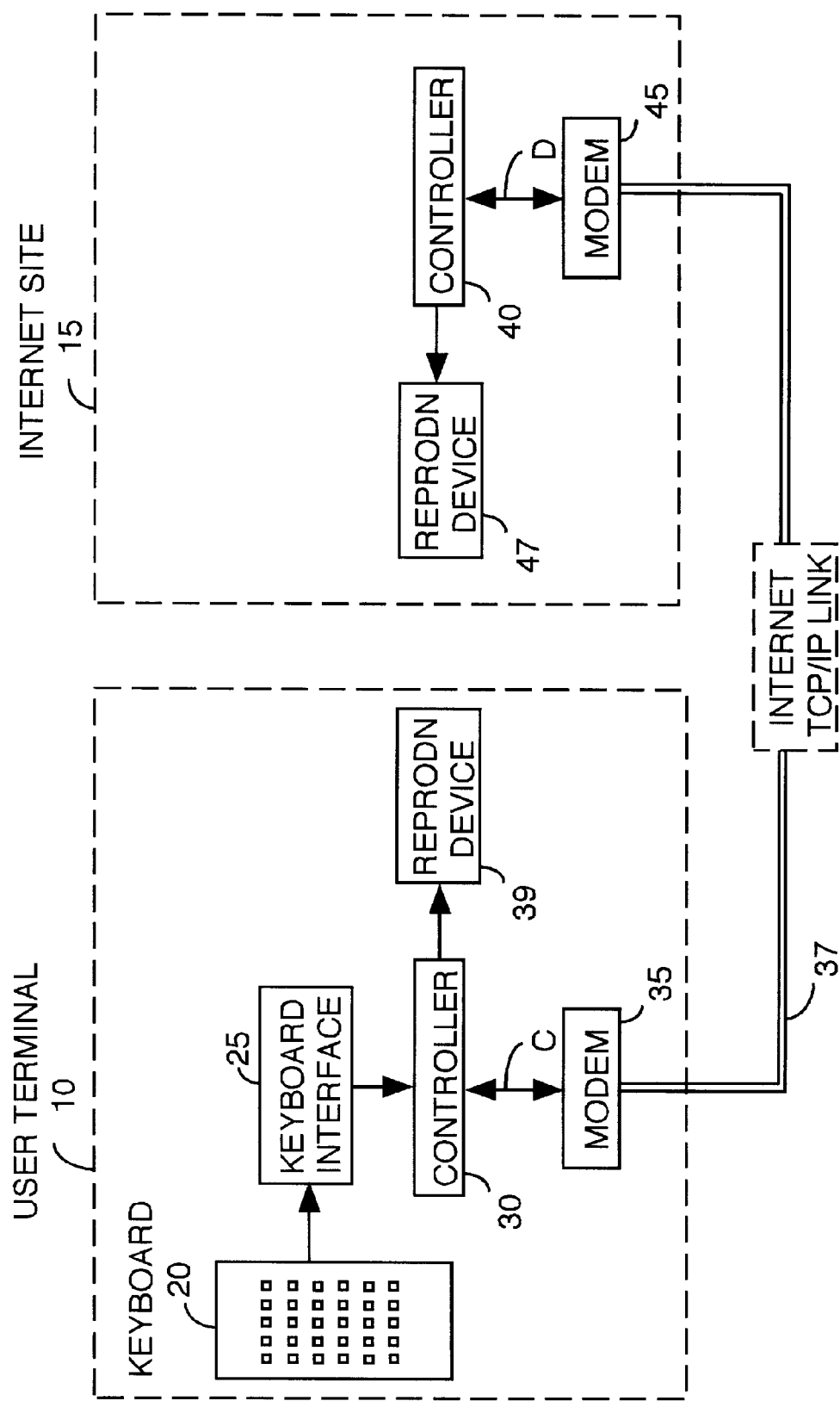
FIG. 1 shows a system supporting uploading, downloading and storage of bookmarks using a remote Internet server type system, according to the invention.

FIG. 1 shows a system supporting uploading, downloading and storage of bookmarks addresses (Universal Resource Locator codes—URLs) using a remote Internet site. A User sends an individual bookmark or a file of bookmarks from the User's Internet terminal 10 to a remote Internet system 15 for storage. Bookmarks stored by the remote Internet system are downloaded to the User's terminal upon User access request. Further, upon User command, data is transferred from a source at a selected downloaded Internet bookmark address to terminal 10 for User viewing or processing. The data transferred from the source at the selected downloaded bookmark address comprises web page information, for example.

Considering FIG. 1 in detail, a User enters commands to controller 30 via keyboard 20 and keyboard interface 25 within User terminal 10 (e.g. a computer with Internet access capability). Units 20 and 25 in other embodiments may comprise any data entry device and compatible interface including a remote control unit, computer mouse system or telephone keypad, for example. Controller 30 directs operation of modem 35 using a bi-directional data and control signal bus C. Controller 30 incorporates a display interface and provides a display signal via the interface to an NTSC compatible video reproduction unit 39 for providing a visual User interface such as PC computer display, for example. Controller 30, in conjunction with modem 35, establishes Internet communication with remote Internet system 15 via telephone lines 37 by dialing a telephone number and transmitting an Internet URL address code of remote Internet system 15. Controller 30, in conjunction with modem 35, establishes communication with processing system 15 using Transmission Control Protocol/Internet Protocol (TCP/IP) and Hypertext Transmission Protocol (HTTP). Hypertext Transmission Protocol 1.1 is specified in RFC2068 (Request For Comment document 2068) January 1997 and other HTTP versions and features (e.g. HTTP 1.0) are described in previous and related RFC documents which are available via the Internet and are prepared by Internet standards working groups. Controller 40, in conjunction with modem 45, within remote Internet system 15 (e.g. an Internet terminal and server system) responds to TCP/IP communications from User terminal 10 and other terminals (not shown to preserve drawing clarity). Within system 15 controller 40 directs operation of modem 45 using a bi-directional data and control signal bus D. Remote Internet system 15 processes, stores and downloads bookmarks and bookmark files received from any Internet data terminal or source. As such, system 15 provides a general Internet bookmark storage service that may be combined with other Internet services. For example, a bookmark storage service may be combined with an Email service (such as Hotmail™) to advantageously offer enhanced Internet functions.

Figure 2:
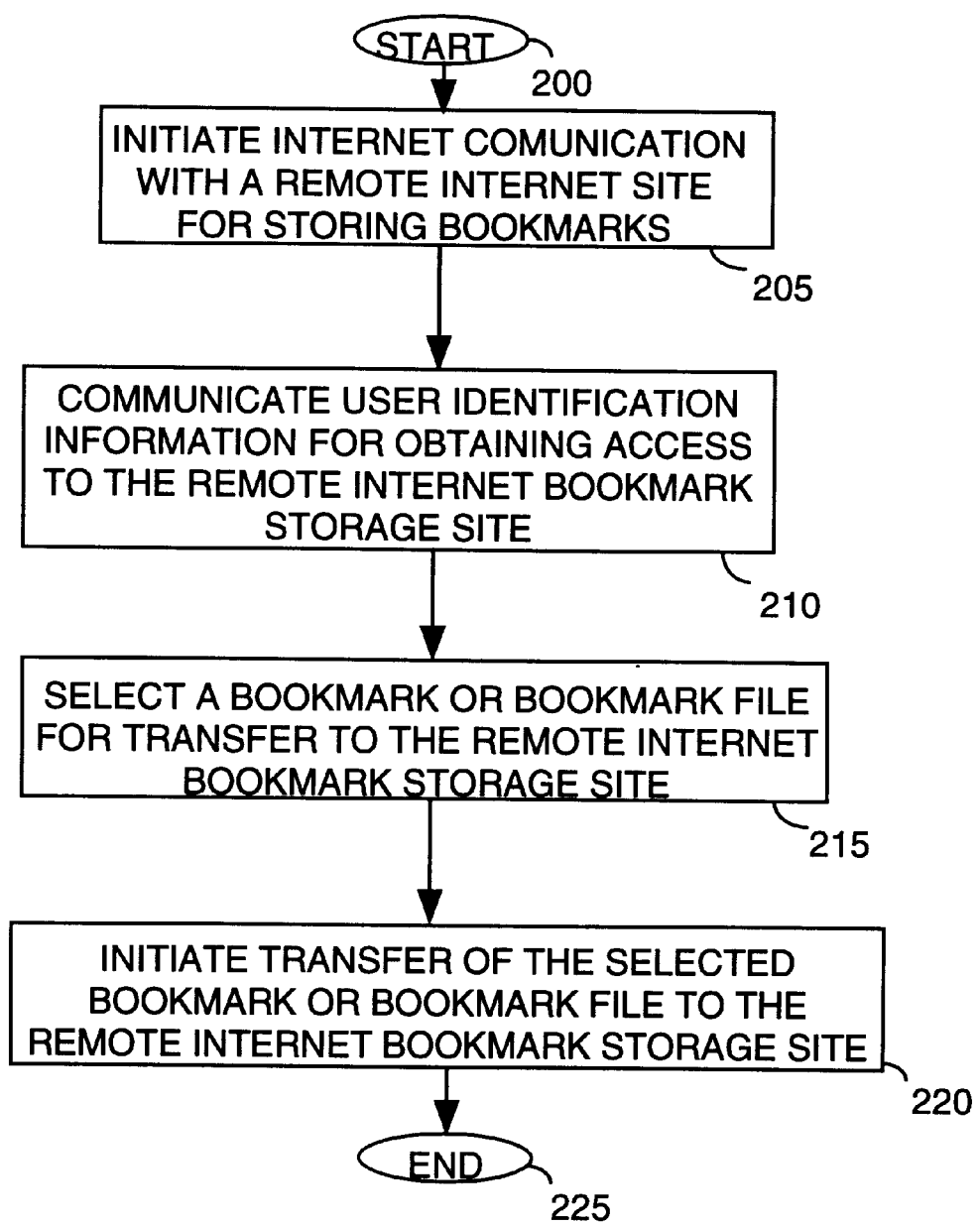
FIG. 2 shows a method for uploading bookmarks from a User terminal to a remote Internet system, according to the invention.

Controller 30 (FIG. 1), employs the method shown in FIG. 2 to upload bookmarks from User terminal 10 to remote Internet system 15. The method of FIG. 2 may be implemented either as a stand alone application or may be implemented within another application such as in combination with the methods to be discussed later in connection with FIGS. 3 and 4 or within an application such as a computer operating system or a web browser. In step 205, following the start at step 200, controller 30, in conjunction with modem 35, establishes Internet TCP/IP and HTTP compatible communication with remote Internet system 15 via telephone lines 37 by dialing a telephone number and transmitting an Internet URL address code of remote Internet system 15. In step 210, a User enters a Userid and password via keyboard 20 and interface 25 in order to obtain access to remote Internet system 15. Controller 30, in conjunction with modem 35, encodes the password and Userid into TCP/IP format and transmits the formatted password and Userid to controller 40 via modem 45 within remote Internet system 15. Controller 40, in step 210, may employ a more complex access and login procedure and the particular procedure used may vary with the specific communication circumstances.

A more complex access procedure may be used when a User at terminal 10 is behind a security firewall or when enhanced login security is required. In the case, for example, that a User at terminal 10 is behind a security firewall, access data may have to be formatted differently by controller 30. This is because an Internet security firewall implementation commonly involves use of a proxy computer application to allow access to the Internet through the firewall (a proxy application is an intermediary application acting on behalf of another application and passes or processes data and commands between the source application and a client application). Such a proxy application may involve different data and communication formats. The formatting and transmitting of access data to system 15 from terminal 10 in such circumstances may involve different Internet communication ports and other protocol requirements, for example. However, the constraints and requirements of communication through Internet security firewalls are known and described, for example, in Internetworking with TCP/IP, chapter 28, vol., 1 third edition, by Douglas E. Comer, 1995. In addition, in other embodiments different User specific conditional access information may also be encoded and transmitted to system 15. Such conditional access information may include additional passwords, entitlement management information and credit card numbers, for example.

In step 215, a User selects an HTML file of Internet bookmark addresses to be uploaded by controller 30 to system 15 via keyboard 20 and interface 25. A User selects an HTML file from a file list visually displayed on unit 39. Although an HTML bookmark file is selected to be uploaded in this exemplary embodiment, bookmark files or addresses encoded in other formats and languages may also be selected for upload e.g. a bookmark file in simple text or an IP address file may be selected and uploaded. In addition, in step 215, an individual bookmark address instead of a file of such addresses may be entered by the User for uploading. In step 220, a User initiates transfer of the selected bookmark file or individual bookmark address from terminal 10 to system 15 for storage via the Internet and telephone lines 37.

In step 220, controller 30, in conjunction with modem 35, establishes communication with controller 40 via modem 45 according to File Transfer protocol (FTP). File Transfer protocol is specified in RFC959 and other related RFC documents which are available via the Internet and are prepared by Internet standards working groups (Request For Comment document 959 of October 1985 is authored by J. Postel and J. Reynolds on behalf of a specific Network Working Group). The selected HTML bookmark file is encoded in TCP/IP and FTP format and is transmitted to controller 40 via modem 45 within remote Internet system 15. Alternatively, the selected HTML bookmark file or individual bookmark may be transferred to system 15 using other file transfer protocols or systems such as TFTP protocol, NFS protocol or an Email transfer mechanism. These and other file transfer mechanisms are described, for example, in Internetworking with TCP/IP, chapter 24, vol., 1 third edition, by Douglas E. Comer, 1995 and other texts. The method of FIG. 2 terminates at step 225.

Figure 3:
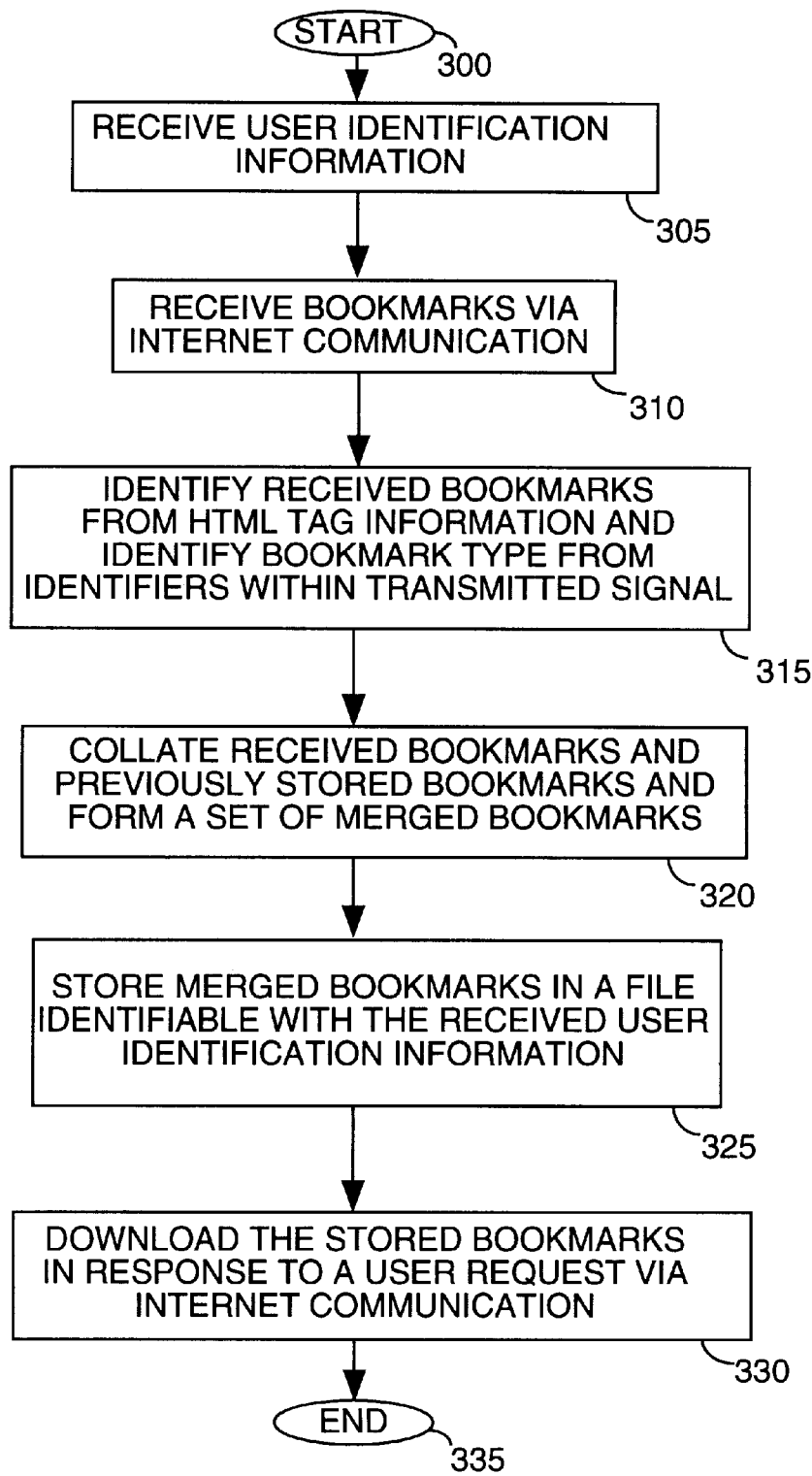
FIG. 3 shows a method for processing and storing bookmarks in a remote Internet system, according to the invention.

Controller 40 of system 15 (FIG. 1) employs the method shown in FIG. 3 for processing and storing bookmarks. The method of FIG. 3 may be implemented either as a stand alone application or may be implemented within another application such as in a server or computer operating system. In step 305, following the start at step 300, controller 40 (FIG. 1), in conjunction with modem 45, establishes Internet TCP/IP and HTTP compatible communication with User terminal 10 via telephone lines 37 in response to communication initiation commands from terminal 10. In step 305, controller 40 receives a User password and Userid via modem 45 from terminal 10. In a different embodiment controller 40 may receive other User specific conditional access information as described in connection with FIG. 2.

In the case of a first time User or a first time transfer of a bookmark file from terminal 10 to system 15, controller 40 in step 305 uses the received User password and Userid in registering a new User and in allocating an internal storage file for storage of a newly received bookmark file. The Userid and password are used by controller 40 in creating a unique User specific file for containing the User's bookmark file received from terminal 10. The Userid and password are also used by controller 40 to restrict access to the bookmark storage service offered by system 15 to those Users who have been registered, that is, to Users that have filled out an on-line Internet registration form to give User specific information to the bookmark storage service provider. Such an on-line registration process is well known and may be performed as part of step 305 or may be performed during a separate initialization process. In addition, the Userid and password received by system 15 from terminal 10 are used by controller 40 in determining whether a specific User is permitted access to an existing User bookmark file.

In step 310, controller 40 receives an HTML bookmark file via modem 45 transmitted according to FTP format from terminal 10. Alternative TCP/IP compatible file transfer protocols may also be used in transferring the bookmark file from terminal 10 to system 15. Controller 40, in conjunction with modem 45, identifies the file transfer protocol used from indicators within the transmitted signal and employs the identified file transfer protocol in receiving the HTML bookmark file transmitted from terminal 10. In step 315, controller 40 identifies the file type received from terminal 10. In the exemplary embodiment the received file is an HTML file and controller 40 identifies individual URL address codes within the received file by parsing the file contents in order to identify HTML tags (e.g. Href tags) that identify HTML statements as URL address codes. Controller 40 also identifies the format type of the address codes in the received file from indicators in the transferred file. The transferred file may contain address codes types in Netscape Navigator™, or Microsoft Explorer™ type formats, for example.

In step 320, controller 40 collates both the bookmarks in the received file and bookmarks previously stored in a User designated file within storage system 15 to form a single merged set of bookmarks. Controller 40, in step 320, collates the bookmarks by categorizing the bookmarks by theme and topic. A bookmark theme e.g. Finance, encompasses the sub-category of topic e.g. different stock price services such as stockmaster.com™ or Yahoo.finance.COM™. Such a collation scheme may also categorize the bookmarks by allocation of different folders or file groups for containing bookmarks of different theme and topic. In addition, bookmarks may be collated in accordance with a master set of theme and topic codes. In this case, individual bookmarks are allocated a topic and theme code and controller 40 collates the bookmarks according to the master set of codes contained in internal memory of system 15.

Controller 40, in step 320, may also collate the bookmarks in the file received from terminal 10 by sorting the bookmarks by an attribute previously allocated to the bookmarks by controller 30 in terminal 10. Such an attribute may be a code, for example, designating one of, a) an allocated bookmark display attribute e.g. color, shading, or shape, and b) characteristics including: i) bookmark source e.g. the geographical area of the web site accessed by the bookmark, or whether the bookmark accesses a personal or company web site etc.; ii) function e.g. whether the bookmark provides access to an Email or other function; and iii) content e.g. whether the bookmark provides access to newspapers, video, etc.

Using the allocated attribute, controller 40, in step 320, may collate the bookmarks in the file received from terminal 10 and present the bookmarks for display to a User. For example, controller 40 may collate bookmarks with different characteristics for display at terminal 10 (or other terminal) in different colors, shading, font, etc. For example, bookmarks addressing a particular source, or bookmarks providing access to web sites with a particular content or function may be displayed in correspondingly different colors. Alternatively, the bookmarks may be collated using a different sorting hierarchy. The described collation process may also be performed at User terminal 10 prior to the storage of the collated bookmarks in remote storage system 15. In step 325, controller 40 stores the collated and merged set of bookmarks in the existing User designated file within system 15.

In the case when a file is transferred to system 15 for the first time and a previously stored file of bookmarks does not exist in system 15, controller 40, in step 320 collates the received bookmarks without forming a merged bookmark set. Also, in this case, controller 40 in step 325 creates a User designated file using the User identification information (Userid and password) and stores the collated non-merged bookmarks in the created file.

In step 330, controller 40 downloads the stored User designated file of bookmarks to terminal 10 (or another terminal) in response to a User request. A User at terminal 10 requests access to a file of bookmarks stored in system 15 from within a web browser application by transmitting an Internet URL address code of remote Internet system 15 and by the process disclosed later in connection with FIG. 4. Terminal 10 establishes FTP compatible communication with controller 40 and modem 45 of system 15. Specifically, terminal 10 establishes FTP compatible communication with system 15 and controller 40 downloads the User designated file requested by the User to terminal 10 from system 15. Using FTP communication, terminal 10 establishes integrated transparent access by the User at terminal 10 to the downloaded bookmark file transferred from system 15. Integrated transparent access allows a User at a terminal to access a file at a remote Internet site as if it was located at the User's site. Integrated transparent access is described, for example, in Internetworking with TCP/IP, vol., 1 third edition, by Douglas E. Comer, 1995, Chapter 24. Using the integrated transparent access established in step 330, a User at terminal 10 may view and select bookmark addresses within the downloaded User designated bookmark file. A User at terminal 10, in step 330, may also acquire Internet data e.g. web page data from a source at a selected bookmark address in the downloaded bookmark file. A User interface permitting selection and transfer of data from bookmarks stored in system 15 is discussed later in connection with FIG. 5.

Alternative mechanisms may be used for downloading the User designated file to terminal 10 and for transferring data to terminal 10 from sources at bookmark addresses within the downloaded file. For example, using FTP communication, a copy of the User designated file stored within system 15 may be downloaded from system 15 and used at terminal 10. Using this mechanism, a User obtains data from Internet sources at addresses within the downloaded copy of the User designated bookmark file. In addition, the User designated file may be transferred to terminal 10 from system 15 using other file transfer protocols or systems such as TFTP protocol, NFS protocol or an Email transfer mechanism. Further, one or more individual bookmarks may be transferred between terminal 10 and system 15 instead of a bookmark file. The process of FIG. 3 terminates at step 335.

Figure 4:
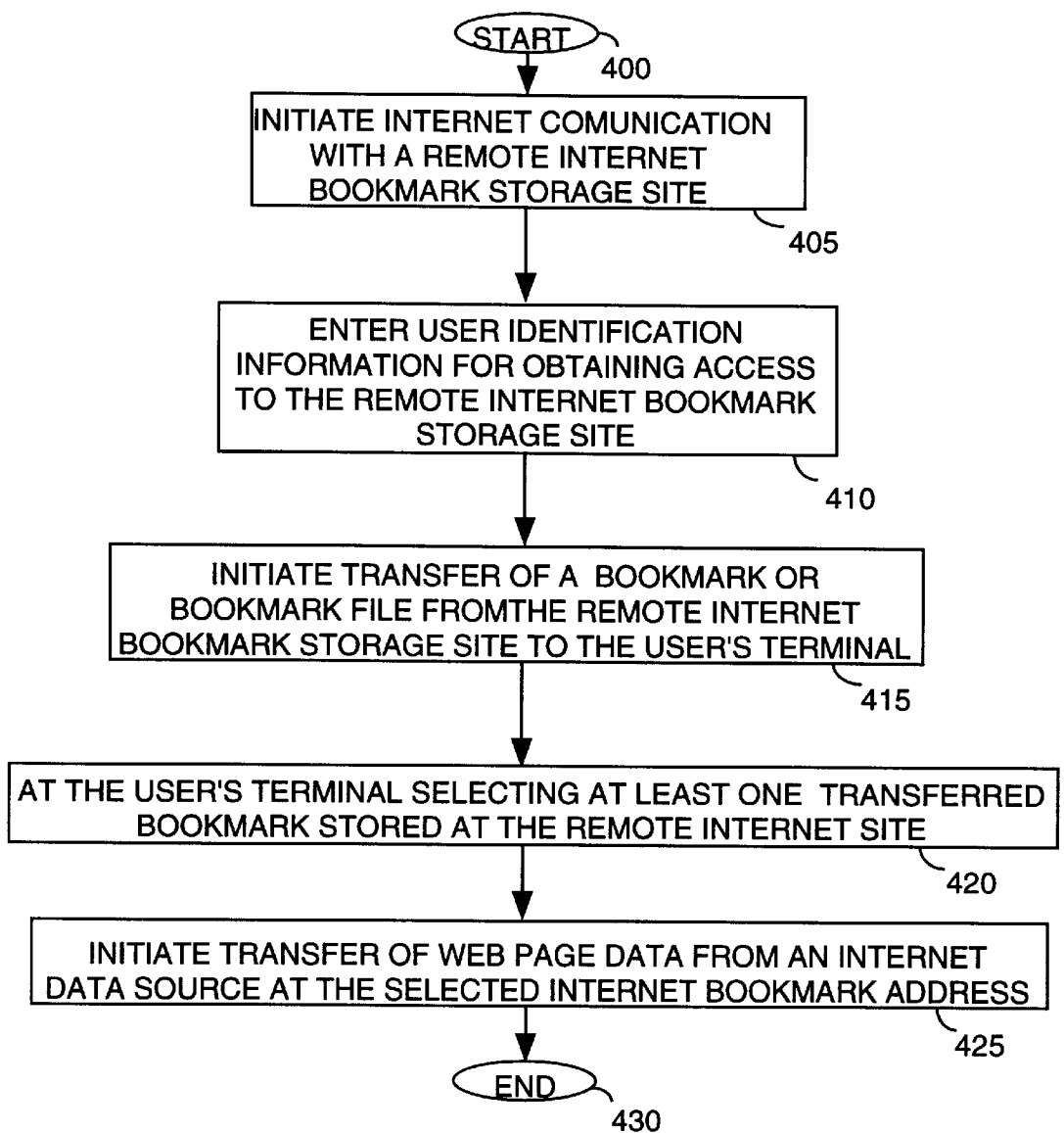
FIG. 4 shows a method employed by an Internet User for accessing Internet data using a remotely stored Internet bookmark address, according to the invention.

Controller 30 of terminal 10 (FIG. 1) employs the method shown in FIG. 4 for accessing Internet data using a remotely stored Internet bookmark address. The method of FIG. 4 may be implemented either as a stand alone application or may be implemented within another application such as in combination with the methods discussed in connection with FIGS. 2 and 3 or within an application such as a computer operating system or a web browser. In step 405, following the start at step 400, controller 30 (FIG. 1), in conjunction with modem 35, establishes Internet TCP/IP and HTTP compatible communication with remote Internet system 15 via telephone lines 37 by dialing a telephone number and transmitting an Internet URL address code of remote Internet system 15.

In step 410 a User enters a Userid and password via keyboard 20 and interface 25 in order to obtain access to remote Internet system 15. The Userid and password are entered by the User within a graphical User interface menu display generated by controller 30 under preprogrammed instruction and presented on unit 39 for viewing by the User. In step 410, controller 30, in conjunction with modem 35, encodes the password and Userid into TCP/IP format and transmits the formatted password and Userid to controller 40 via modem 45 within remote Internet system 15. In other embodiments different User specific conditional access information may also be encoded and transmitted to system 15 as previously described in connection with FIG. 2, for example.

In step 415, controller 40 identifies a User designated bookmark address file previously stored within system 15. Controller 40 identifies the User designated bookmark address file using the Userid and password transmitted to controller 40 from terminal 10 in step 410. Further, controller 30 in step 415 establishes FTP compatible communication with controller 40 and modem 45 of system 15. Specifically, controller 30 establishes integrated transparent access mode communication with system 15 according to the FTP specification requirements.

In this mode, controller 40 responds to the communication from controller 30 by downloading the identified User designated bookmark address file stored within system 15 to terminal 10. Further, in step 415 controller 30 establishes integrated transparent access by the User at terminal 10 to the downloaded bookmark file transferred from system 15. In step 420 a User at terminal 10 employs the integrated transparent access FTP mode application established in step 415 to view and select a bookmark address within the downloaded User designated bookmark file. A User selects a bookmark address using keyboard 20 from within the downloaded User designated bookmark file contents presented on unit 39 in a graphical User interface menu display generated by controller 30 under preprogrammed instruction.

In step 425, a User at terminal 10 initiates acquisition of Internet data from a source at the bookmark address selected in step 415. Controller 30 in step 425 establishes conventional Internet TCP/IP communication with a source at the selected Internet bookmark address using a web browser application such as Netscape Navigator™, Microsoft Explorer™ or other web browser. The web browser application operates in conjunction with the FTP communication application established by terminal 10 with system 15. Controller 30 in step 425 establishes Internet access to the source at the selected Internet bookmark address by dialing a telephone number using modem 35 and transmitting the selected bookmark address (Internet URL address code) and user entitlement data to an Internet server or service provider such as America On-line™ via telephone lines 37. Controller 30 in step 425 receives web page data (including TCP/IP identification data) from the responding Internet server or service provider.

The response web page data transferred to terminal 10 contains the information necessary to enable controller 30 and modem 35 to identify, assemble and decode the TCP/IP packets containing the HTML and associated JAVA™ data (and other data e.g. JPEG, GIF, TIF type data) comprising the requested web page. Controller 30 in step 425 identifies, decodes and formats the web page response data for display on unit 39 using its internal display signal processor. The formatted response web page information from the source at the selected Internet bookmark address remotely stored within system 15 is displayed to the User on reproduction device 39. In an alternative embodiment, the User designated file may be transferred to terminal 10 from system 15 using other file transfer protocols or systems as previously described in connection with FIG. 3. Further, also as previously disclosed in connection with FIG. 3, one or more individual bookmarks may be transferred between terminal 10 and system 15 instead of a bookmark file. The process of FIG. 4 terminates at step 430.

FIG. 5 shows an exemplary User interface display downloaded from system 15 (FIG. 1) to terminal 10 and displayed on unit 39 during the integrated transparent access mode disclosed in FIGS. 3 and 4. The downloaded User interface display permits a User at terminal 10 to access data at Internet bookmark addresses stored in a User specific file within remote Internet system 15. A User accesses a bookmark address such as one of the bookmark addresses represented by address links 505–525) in the bookmark display area on the left of the screen (screen area 503) by highlighting and selecting an individual bookmark address using keyboard 20. Controller 30, in response to the keyboard 20 selection, establishes conventional Internet TCP/IP communication with a source at the selected Internet bookmark address using a web browser application as previously described in connection with FIG. 4. Controller 30 receives response web page data from the source addressed by the selected bookmark address via telephone lines 37 and modem 35 from a responding Internet server or service. Bookmark addresses 505 and 510 represent information sources of one theme and topic (finance and stock market quotation services) and may be presented using a specific color or shading on display 39. Bookmark addresses 515, 520 and 525 represent information sources of a second and different theme and topic (entertainment and newspapers) and may be presented in a different color or shading on display 39. The bookmark address coloring or shading used for presentation on display 39 may involve highlighting, simple text coloring, or background and foreground color or shading variation, for example.

Controller 30, as previously described in connection with FIG. 4, identifies, decodes and formats the web page response data for display in screen area 530 of FIG. 5 on unit 39 (FIG. 1). Screen areas 540 and 550 of the User interface display may be used for displaying advertisements and for displaying menu icons for User initiation of web browser type control functions such as the functions available within the Netscape Navigator™, or Microsoft Explorer™ web browsers.

Although the disclosed system is described in the context of an Internet compatible system using TCP/IP, HTTP and FTP communication protocols, it is exemplary only. The principles of the invention may be applied to systems in which the types of transmission channels, coding types and communication protocols may vary. Such systems may include, for example, Intranet systems, commercial and proprietary networks and computer and communication networks in general, involving other types of encoding and different communication address formats. Further, although the disclosed system is described as processing HTML bookmark addresses, this is exemplary only. The invention principles apply to systems that process different types of bookmark addresses in computer languages other than HTML.

What is claimed is:

1. A method for processing Internet bookmarks for transfer to an Internet site for storage, comprising the steps of:
   at a User site,
   a) initiating Internet communication with a remote Internet site for storing bookmarks;
   b) communicating User identification information for obtaining access to said remote Internet site;
   c) selecting a file of User bookmarks for transfer, and
   d) initiating transfer of said file of User bookmarks to a User specific file at said remote Internet site for access by said User and excluding access by others.

2. A method according to claim 1, wherein
   said Internet bookmarks are at least one of a) Internet Universal Resource Locator (URL) addresses and b) IP addresses.

3. A method according to claim 1, wherein said file of User bookmarks comprises one or more bookmarks.

4. A method according to claim 1, wherein said file of User bookmarks is an HTML file.

5. A method according to claim 1, wherein said step of initiating Internet communication comprises establishing communication according to at least one of a) TCP/IP protocol, b) HTTP protocol, and c) a file transfer protocol.

6. A method according to claim 5, wherein said step of initiating transfer of said file of User bookmarks uses a file transfer protocol selected from a) FTP protocol, b) TFTP protocol, c) NFS protocol and d) Email transfer.

7. A method according to claim 1, wherein said step of entering User identification information comprises the step of entering a) a Userid and b) a User password.

8. A method according to claim 1, wherein said step of initiating transfer of said at least one selected bookmark comprises uploading said file of User bookmarks using TCP/IP protocol for secure storage at said remote Internet site in a file associated with said User and accessible following entry of User identification information.

9. A method for accessing Internet data using a remotely stored Internet address or bookmark (URL code), comprising the steps of:
at a User site,
 a) initiating Internet communication with a remote Internet site;
 b) communicating User identification information for obtaining access to a bookmark stored at a remote Internet site in a User specific file of bookmarks and excluding access by others, said User specific file being accessed by said User with said User identification information;
 c) selecting at least one bookmark stored at said remote Internet site in said User specific file; and
 d) initiating data transfer from an Internet data source at said at least one selected bookmark address.

10. A method according to claim 9, wherein said step of initiating Internet communication comprises establishing communication according to at least one of a) TCP/IP protocol, b) HTTP protocol, and c) a file transfer protocol.

11. A method according to claim 9, including the step of initiating transfer of said selected bookmark from said remote Internet site to said User site, and wherein said step of
initiating data transfer comprises initiating data transfer from an Internet data source at said transferred selected bookmark address.

12. A method according to claim 11, wherein said step of initiating transfer of said bookmark from said remote Internet site to said User site uses a file transfer protocol selected from a) FTP protocol, b) TFTP protocol, c) NFS protocol and d) Email transfer.

13. A method according to claim 9, wherein said step of initiating Internet communication with a remote Internet site comprises establishing secure integrated transparent access to said User specific file of bookmarks at said remote Internet site.

14. A method according to claim 9, including the step of initiating transfer of said User specific file of bookmarks from said remote Internet site to said User site, and wherein said step of
selecting at least one bookmark stored at said remote Internet site comprises selecting a bookmark within said transferred User specific file.

15. A method according to claim 9, wherein
said selecting step comprises selecting said User specific file of bookmarks stored at said remote Internet site, and
said step of initiating data transfer comprises initiating data transfer from an Internet data source at a selected bookmark address within said User specific file.

16. A method according to claim 15, wherein said User specific file of bookmarks is an HTML file.

17. A method according to claim 9, wherein said step of communicating User identification information comprises the step of communicating at least one of a) a Userid and b) a User password.

18. In a system suitable for storing Internet addresses or bookmarks (URL codes), a method for processing bookmarks, comprising the steps of:
at an Internet location,
 a) receiving User identification information;
 b) receiving a file of bookmarks via Internet communication;
 c) storing said file of bookmarks in a User specific file for access by said User with said User Identification information and excluding access by others; and
 d) downloading said stored bookmarks in response to a request via Internet communication.

19. A method according to claim 18, wherein
said file of bookmarks comprises one or more bookmarks.

20. A method according to claim 18, including the step of identifying the type of said Internet bookmark from types including at least one of a) Netscape Navigator™ and b) Microsoft Explorer™.

21. A method according to claim 18, including the step of, within a plurality of bookmark files,
sorting said received files of bookmarks by User using said User identification information.

22. A method according to claim 18, including the step of collating previously stored bookmarks in said User specific file and said received file of bookmarks to form a merged set of User specific bookmarks.

23. A method according to claim 18, wherein said step of receiving said file of bookmarks comprises receiving an HTML file of bookmarks associated with a specific User.

24. A method according to claim 18, wherein said step of receiving User identification information comprises the step of receiving at least one of a) a Userid and b) a User password.

25. A method for collating Internet bookmark addresses for display, comprising the steps of:
 a) allocating a display attribute including at least one of, (a) color, (b) shading, and (c) shape to one of (i) individual Internet bookmark addresses, and (ii) a file of bookmark addresses, said display attribute representing a characteristic of a category of said bookmark addresses;
 b) collating bookmark addresses by said characteristic; and
 c) displaying said collated bookmark addresses together with a corresponding allocated display attribute.

26. A method according to claim 25, wherein
said display attribute includes at least one of, background highlighting, foreground highlighting, shading variation and color variation, and said characteristic comprises at least one of, a) source, b) function, c) content, and d) theme or topic.

27. A web browser for performing Internet browsing functions including web page acquisition, comprising:
an Internet bookmark processor for transferring a file of bookmarks to a remote Internet site for storage and for retrieving bookmarks from said remote Internet site by
a) communicating identification information to said remote Internet site for obtaining access to said remote Internet site and excluding access by others;
b) initiating upload of said file of User bookmarks to said remote Internet site for storage in response to user selection of a first browser command; and
c) initiating download of at least one of (a) a bookmark and (b) a file of bookmarks from a User specific file stored at said remote Internet site in response to user selection of a second browser command.

28. A web browser according to claim 27 wherein said file of User bookmarks comprises one or more bookmarks.

* * * * *